(12) United States Patent
Escobosa et al.

(10) Patent No.: US 6,271,831 B1
(45) Date of Patent: *Aug. 7, 2001

(54) WIRELESS CONTROL AND POINTER SYSTEM

(75) Inventors: Marcus Escobosa, Placentia; Youping Yun, Monterey Park; Fusheng Frank Chen, Santa Ana, all of CA (US)

(73) Assignee: Universal Electronics Inc., Cypress, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,447

(22) Filed: Apr. 3, 1997

(51) Int. Cl.⁷ .................................................. G09G 5/08
(52) U.S. Cl. ......................... 345/158; 345/169; 348/734; 340/825.72
(58) Field of Search ..................................... 345/156, 157, 345/158, 159, 163, 161, 169; 348/734, 114; 340/825.57, 825.72; 359/152, 154, 143, 172, 159; 315/291

(56) References Cited

U.S. PATENT DOCUMENTS

| | | | |
|---|---|---|---|
| 3,662,180 | 5/1972 | Jorgensen | 359/142 |
| 4,221,932 * | 9/1980 | Anglikowski et al. | 359/154 |
| 4,313,227 | 1/1982 | Eder | 345/168 |
| 4,578,674 * | 3/1986 | Baker et al. | 345/159 |
| 4,654,648 | 3/1987 | Herrington | 345/179 |
| 4,682,159 | 7/1987 | Davison | 345/158 |
| 4,687,918 | 8/1987 | Hughes | 359/142 |
| 4,745,402 | 5/1988 | Auerbach | 345/158 |
| 4,768,028 | 8/1988 | Blackie | 345/145 |
| 4,796,019 | 1/1989 | Auerbach | 345/169 |
| 4,959,721 | 9/1990 | Micic | 345/146 |
| 5,023,943 | 6/1991 | Heberle | |
| 5,045,843 | 9/1991 | Hansen | 345/158 |
| 5,059,959 | 10/1991 | Barry | 345/168 |
| 5,068,645 | 11/1991 | Drumm | 345/184 |
| 5,128,667 | 7/1992 | Enomota | 359/146 |
| 5,237,264 * | 8/1993 | Moseley et al. | 315/291 |
| 5,307,194 | 4/1994 | Hatton | 359/154 |
| 5,339,095 * | 8/1994 | Redford | 345/169 |
| 5,349,460 | 9/1994 | Ogasahara | 345/157 |

(List continued on next page.)

FOREIGN PATENT DOCUMENTS

| | | |
|---|---|---|
| 0209411 | 6/1986 | (EP) . |
| 9323840 | 11/1993 | (WO) . |

OTHER PUBLICATIONS

Shibuya Y, Hagimoto M: Infrared LED with Collimating lens OKI Technical Review, vol. 60, No. 149, Apr. 1994, pp. 5–8, XP000863796, Japan * p. 5, right–hand col., line 5–line 7 *.

Primary Examiner—Dennis-Doon Chow
(74) Attorney, Agent, or Firm—Mark R. Galis; Gary R. Jarosik; John E. Hyatt

(57) ABSTRACT

A wireless control and pointer system for controlling electronic equipment. The system generally includes a hand held remote control comprising a first infrared signal emitter for use in transmitting a first infrared signal comprising a plurality of signal components each of which is transmitted at a first frequency but out of phase with respect to the other of the plurality of signal components and a receiver comprising an infrared signal sensor adapted to receive the infrared signal, a circuit connected to the infrared signal sensor for generating an orientation signal indicative of the orientation of the remote control as a function of the amplitude of each of the plurality of signal components of the infrared signal, and an interface circuit for transmitting a command signal indicative of the orientation signal to the electronic equipment.

16 Claims, 7 Drawing Sheets

U.S. PATENT DOCUMENTS

| | | | |
|---|---|---|---|
| 5,359,348 | 10/1994 | Pilcher | 345/158 |
| 5,448,261 | 9/1995 | Koike | 315/362 |
| 5,525,980 | 6/1996 | Jahier | 341/33 |
| 5,600,471 * | 2/1997 | Hirohashi et al. | 359/152 |
| 5,603,078 * | 2/1997 | Henderson et al. | 348/734 |
| 5,627,565 * | 5/1997 | Morishita et al. | 345/158 |
| 5,963,145 * | 10/1999 | Escobosa | 345/169 |

* cited by examiner

WIRELESS CONTROL AND POINTER SYSTEM

BACKGROUND OF THE INVENTION

This invention relates generally to wireless control of electronic equipment and, more particularly, relates to a hand held remote control and pointer device capable of controlling the operation of an electronic component which may include the movement of a cursor displayed on a display screen of an electronic component such as a personal computer, a television receiver, or the like.

In the art, various systems for providing wireless control of electronic equipment have been proposed. An example of one such system may be seen in U.S. Pat. Nos. 4,745,402 and 4,796,019 to Auerbach. These patents both disclose a system using a remote control transmitter having the capability for controlling the movement of a cursor displayed on a display screen of an electronic device as well as the capability for controlling the operation of the device itself. The control of the cursor is disclosed to be a function of a perceived change in the angular position of the remote control while the control of the electronic device is disclosed to be a function of transmitted, dedicated, function data. More particularly, the angular position information is described as being a function of the phase angle and amplitude of the resultant of the combined signals transmitted from the energized LEDs of the remote control.

A further example of a wireless control and pointing system may be found in co-pending U.S. patent Ser. No. 08/605,546 entitled "System For Providing Wireless Pointer Control" filed on Feb. 26, 1996 in the name of Marcus Escobosa and assigned to the assignee of the subject invention. The '546 application discloses a system including a remote control pointer device capable of generating a signal having multiple signal components with different frequencies and a base station capable of receiving and decoding the signal. The base station interprets the multiple signal components to determine the orientation of the remote control pointer device to properly generate a pointer control signal for properly selecting a particular piece of equipment to receive remote commands or data, and where appropriate, properly displaying and positioning a cursor displayed on the electronic equipment. To assist in an understanding of the subject invention, the full disclosure found in the '546 patent application is hereby incorporated by reference in its entirety.

While the wireless command and pointing systems described above provide a means for controlling the operation of an electric appliance in conjunction with the ability to control the movement of a cursor displayed on a display screen, it is a general object of the present invention to provide an improved wireless command and pointer system having the capability to control the operation of an electric appliance in conjunction with the ability to control the movement of a cursor with a relatively higher degree of precision than found in the prior art. It is further object of the present invention to provide a wireless pointer capable of preventing a cursor from being vibrated due to unintentional movement of the hand of an operator. It is yet another object of the present invention to provide a wireless pointer system in which frequency interference resulting from electrical lighting is minimized. It is still a further object of the present invention to provide a wireless pointer in which a lens allows for the transmission of an improved radiation pattern.

SUMMARY OF THE INVENTION

In accordance with the present invention, a wireless control and pointer system for controlling electronic equipment is provided. The system generally includes a hand held remote control comprising a first infrared signal emitter for use in transmitting a first infrared signal comprising a plurality of signal components each of which is transmitted at a first frequency but out of phase with respect to the other of the plurality of signal components and a receiver comprising an infrared signal sensor adapted to receive the infrared signal, a circuit connected to the infrared signal sensor for generating an orientation signal indicative of the orientation of the remote control as a function of the amplitude of each of the plurality of signal components of the infrared signal, and an interface circuit for transmitting a command signal based upon the orientation signal to the electronic equipment.

In another embodiment of the invention, the system includes a hand held remote control comprising a plurality of LEDs for use in transmitting an infrared signal comprising a plurality of separately identifiable signal components and a lens for modifying the radiation pattern emitted by each of the plurality of LEDs where the intensity of the radiation pattern is seen to be a function of angle with respect to the central axis of each of the plurality of LEDs and a receiver comprising an infrared signal sensor adapted to receive the plurality of separately identifiable signal components, a circuit connected to the infrared signal sensor for generating an orientation signal indicative of the orientation of the remote control in response to a characteristic of the plurality of separately identifiable signal components, and an interface circuit for transmitting a command signal based upon the orientation signal to the electronic equipment.

In a further embodiment of the invention, the system generally comprises a hand held remote control comprising a infrared signal emitter for use in transmitting an infrared signal comprising a plurality of separately identifiable signal components and a means for synchronizing the transmission of the plurality of separately identifiable signal components to an external interference signal and a receiver comprising an infrared signal sensor adapted to receive the plurality of separately identifiable signal components, a circuit connected to the infrared signal sensor for generating an orientation signal indicative of the orientation of the remote control as a function of a characteristic of the plurality of separately identifiable signal components, and an interface circuit for transmitting a command signal based upon the orientation signal to the electronic equipment.

A better understanding of the objects, advantages, features, properties and relationships of the invention will be obtained from the following detailed description and accompanying drawings which set forth an illustrative embodiment and are indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

Figure 1:
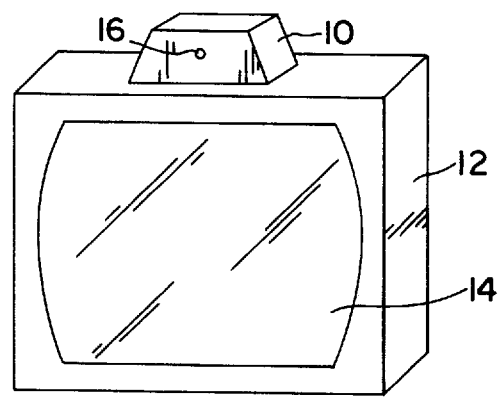
FIG. 1 illustrates a perspective view of a receiver which receives a pointer control signal which is supplied for the purpose of controlling an electric device and/or for controlling the movement of a displayed cursor.
Figure 2:
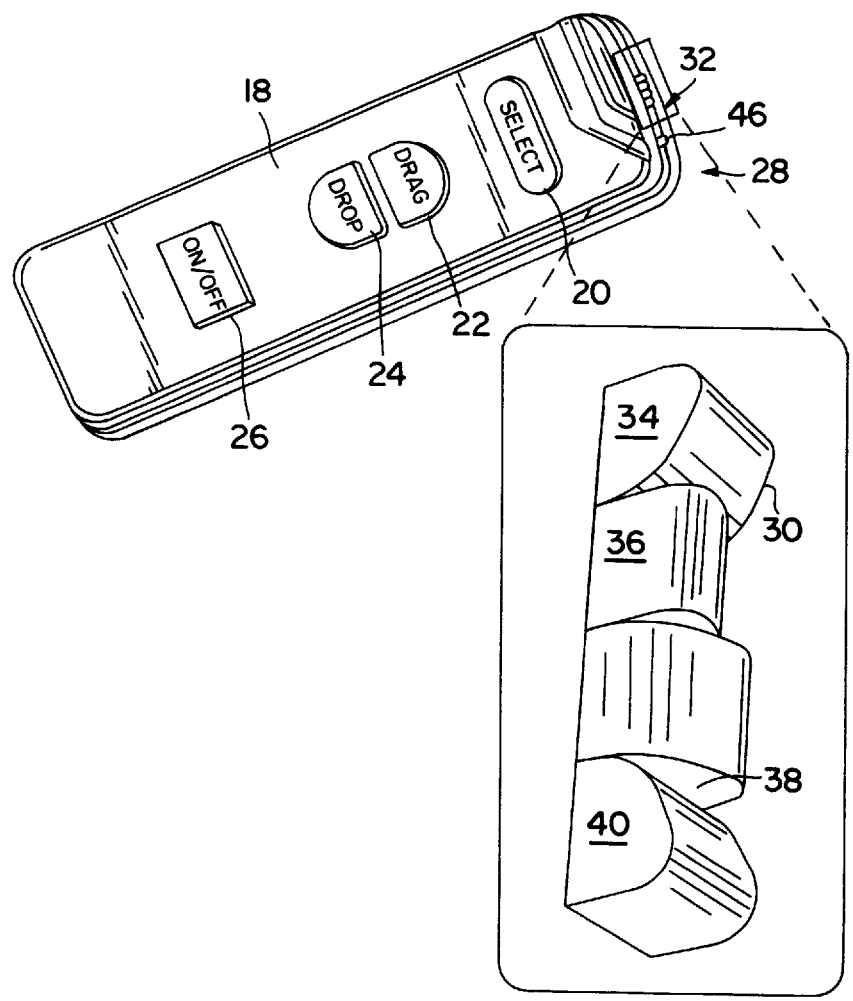
FIG. 2 illustrates a perspective view of the hand held, remote control capable of generating the pointer control signal received by the receiver illustrated in FIG. 1.

Referring now to the figures, wherein like reference numerals refer to like elements, there is illustrated in FIG. 1 a perspective view of a receiver 10. The receiver 10 is used to supply a control signal to a device, illustrated as a television set 12, being pointed at and/or to control the movement of an electronically displayed cursor. The receiver 10 is preferably placed proximate to the screen 14 or display of the electronic device and includes a sensor 16 for receiving transmitted information from a remote control 18, shown in FIG. 2, which includes user actuatable buttons 20,22,24 and 26. While the user actuatable buttons 20,22,24, and 26 are illustrated as relating to cursor control, e.g. select, drag, drop, etc., it will be understood that the user actuatable buttons may also be related to ordinary electronic appliance control functions, e.g. channel up, channel down, volume, mute, play, rewind, etc. As will be described in greater detail hereinafter, the control of the electronically displayed cursor and/or the control of the electronic device is a respective function of the perceived orientation of the wireless pointer or remote control 18 and/or the transmission of function data from the remote control 18 to the receiver 10.

Figure 4:
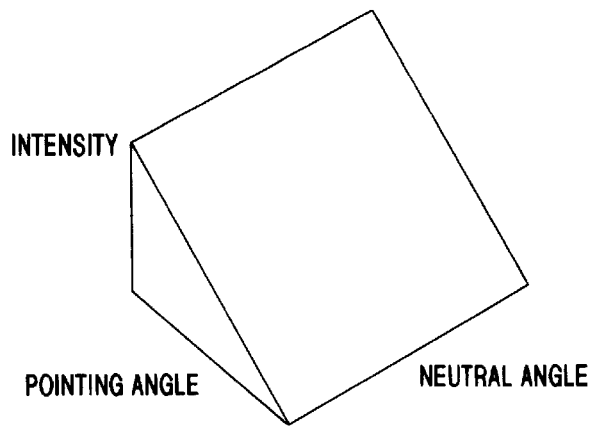
FIG. 4 illustrates a radiation pattern emitted by one of the LEDs and lenses illustrated in FIG. 2.

Positioned in the front 28 of the remote control 18 is a signal generating element 32 which is used to transmit the wireless positioning data to the receiver 10. In the preferred embodiment, the signal generating element 32 comprises four infra-red light emitting diodes (LEDs) 34, 36, 38 and 40 over each of which is preferably fitted a lens 30 which is used to modify the radiation pattern. Specifically, as illustrated in FIG. 4, each of the lenses 30 function to modify the radiation pattern which is normally emitted by the LED so that intensity is a function of angle with respect to the LEDs central axis. In this manner, the intensity on one axis will vary with angle, while the intensity on the orthogonal axis remains nearly constant. Each of the four LED/lens combinations will have the radiation pattern illustrated in FIG. 4 excepting that each is rotated in increments of 90 degrees from the other diodes.

The LEDs/lenses are further grouped into pairs wherein LED 34 is paired with LED 40 and LED 36 is paired with LED 38. More specifically, one pair of LEDs is provided to allow the tracking of the orientation of the remote control 18 moving up or down while the other pair of LEDs is provided to allow the tracking of the orientation of the remote control 18 moving side to side. In the preferred embodiment, the up and down LEDs have their radiation patterns of FIG. 4 orientated at 0 and 180 degrees respectively while the left and right LEDs have their radiation patterns of FIG. 4 orientated at 90 and 270 degrees respectively. Angular position is determined by the relative intensities of the LEDs as received by the receiver 10. When transmitting position data, which may be continuous or in response to activation of a button/switch on the keypad 44, each LED 34,36,38 and 40 transmits a signal which is split into four phases among each of the LEDs. By way of example, the up and down LEDs transmit the signal with phase shifts of 0 degrees and 180 degrees respectively while the right and left LEDs transmit the signal with phase shifts of 90 degrees and 270 degrees respectively. Since each of the LEDs is differentiated from the other by phase, both amplitude and phase carry the positioning information.

Figure 3:
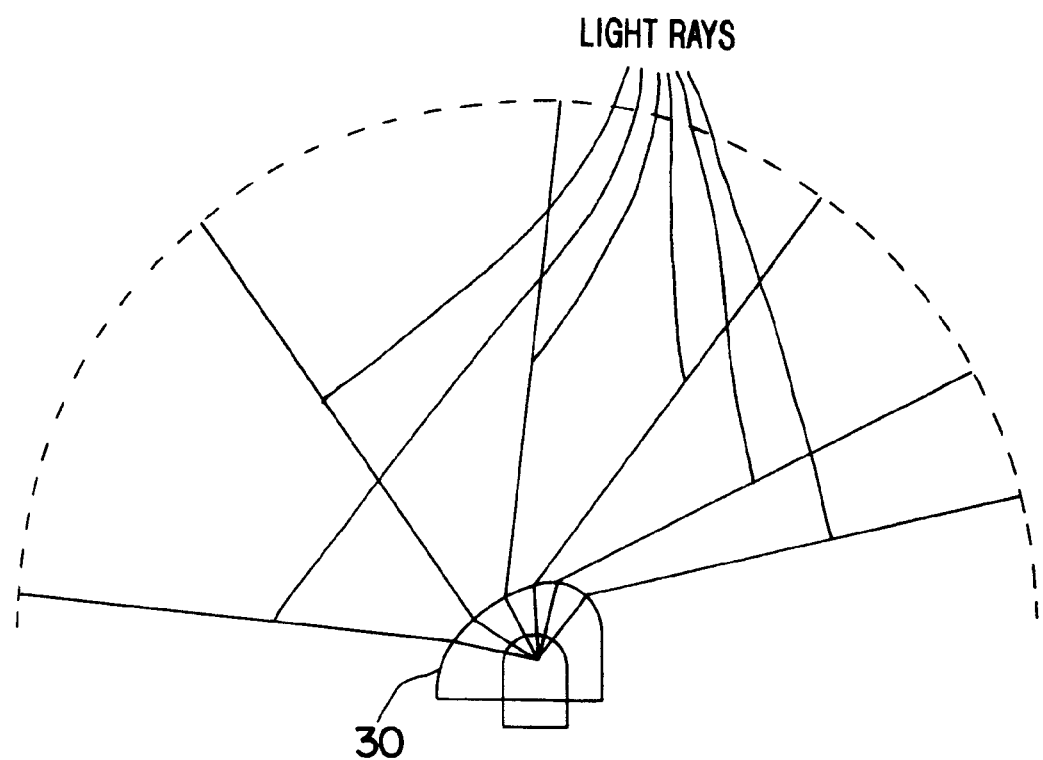
FIG. 3 illustrates a ray tracing resulting from the use of one of the LED and lenses illustrated in FIG. 2.

The desired intensity curve of the radiation pattern is generated by causing most of the light emitted from the LED to cluster toward one end, with a nearly linear intensity fall off occurring as the lens 30 is viewed from the other end. A ray tracing of this intensity pattern may be seen in FIG. 3. As illustrated, the area with the closest spaced light rays will be the brightest area while the area with the farthest spaced light rays will be the least brightest area. In order to achieve these approximate radiation patterns from the LEDs, the lens 30 is generally curved in one direction and is generally flat in the other. The flatness allows the radiation pattern to be stable given variations in diode manufacturing and lens manufacturing. This stability is not presently available in those lenses currently utilized which are generally described as being curved in both directions.

Figure 10:
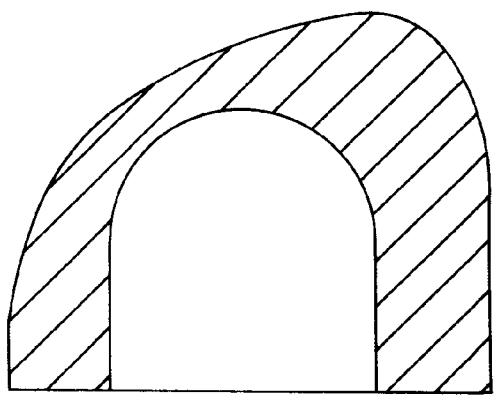
FIG. 10 illustrates a cross-sectional side view of one of the lenses illustrated in FIG. 2.
Figure 11:
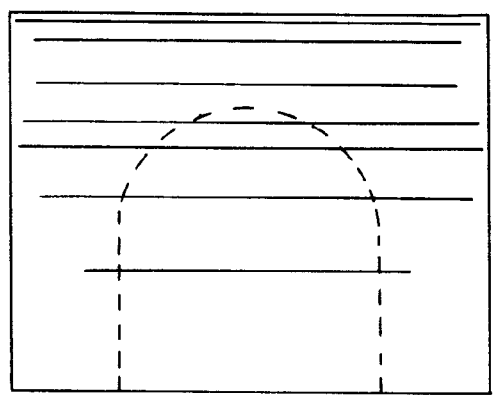
FIG. 11 illustrates a front plan view of one of the lenses illustrated in FIG. 2.
Figure 12:
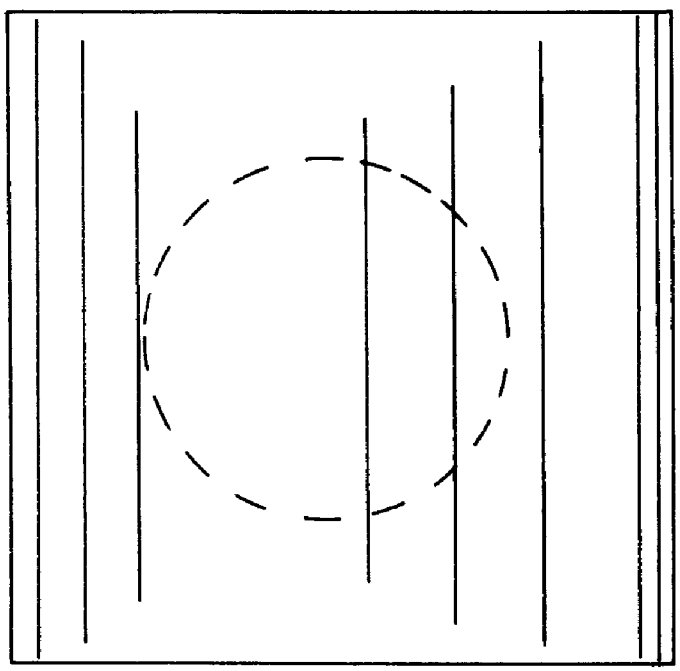
FIG. 12 illustrates a bottom plan view of one of the lenses illustrated in FIG. 2.

In the preferred embodiment of the invention, the lens 30 is constructed from a plastic material such as clear acrylic or clear polyurethane (e.g. Synclair Corporation's polyurethane sold under the trademark "CLEARCAST") while each of the LEDs is preferably mounted within a lens 30 using an adhesive having substantially the same index of refraction as the material from which the lens is constructed. The lens 30 is shown in greater detail in FIGS. 10–12. It is to be understood that the four lenses 30 may be manufactured as a unitary piece or as four separate pieces without departing from the spirit of the subject invention. Similarly, the lenses need not be arranged in the linear orientation shown and the positioning of each of the lenses may be interchanged while maintaining the desired radiation patterns.

Figure 5:
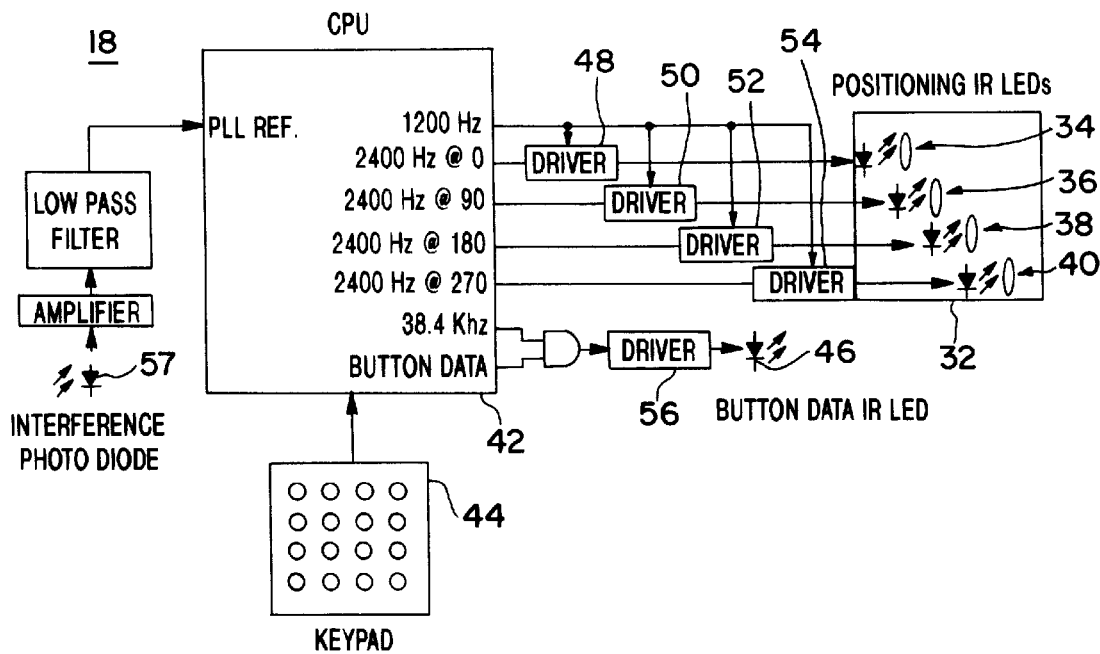
FIG. 5 illustrates a block diagram schematic of the hand held, remote control of FIG. 2.

Turning to FIG. 5, the electrical components from which the remote control 18 is comprised are illustrated in greater detail. As illustrated, the remote control 18 comprises a CPU 42 having a storage device for storing program instructions and program data, a keypad 44 (supporting buttons 22, 24, 26 and 28), positioning LEDS 34,36,38, and 40, command data LED 46, and driver circuits 48, 50, 52, 54, and 56. In addition, the remote control 18 is preferably equipped with an optional, optical sensor 57 that allows the remote control 18 to detect and ultimately synchronize to the interference signal that typically comes from florescent lights. Specifically, the interference is generated when florescent lights turn on and off at twice the rate of the electrical power. In the U.S., where the wall power frequency is 60 Hz, the florescent lights will turn on and off at a rate of 120 Hz while in other European/Asian countries, where the wall power frequency is 50 Hz, the florescent lights will turn on and off at a rate of 100 Hz. If there exists such an interference signal, the output of the sensor 57, typically a photo diode, is fed to the CPU through an amplifier and low pass filter so that the CPU will see the interfering 100 Hz or 120 Hz signal. The CPU then utilizes a 2nd order DSP phase locked loop (PLL)

to synchronize to the interfering signal. In this way, the positioning signal and position reference signal may also be phase locked to the interference signal such that position updates occur on integer multiples of the 50 Hz or 60 Hz periods. For this purpose, the frequency of the positioning signal and position reference signal are preferably selected to be multiples of one another and the two typical interference signals. While not limiting, the frequencies selected were 2400 Hz and 1200 Hz for the positioning and position reference signals respectively.

The type of interference that the PLL helps to eliminate is a very slow cursor rocking action. Specifically, if there is a small difference between the update rates and the 50 Hz or 60 Hz noise signal, there will result a small but noticeable noise difference that is not constant from position update to position update. This small difference will manifest itself as unwanted cursor movement. Since the PLL causes the 50 Hz or 60 Hz noise to be synchronized to the 1200 Hz and 2400 Hz signals, the 50 Hz or 60 Hz periods will not move in time relative to the cursor update rate. The result is an interference which is considered to be constant and, as such, will not result in the differences above-noted which result in unwanted cursor movement. Furthermore, as the base will be seen to be synchronized to the 1200 Hz signal, the base will also be synchronized to the 50 Hz or 60 Hz interference signals.

Figure 6:
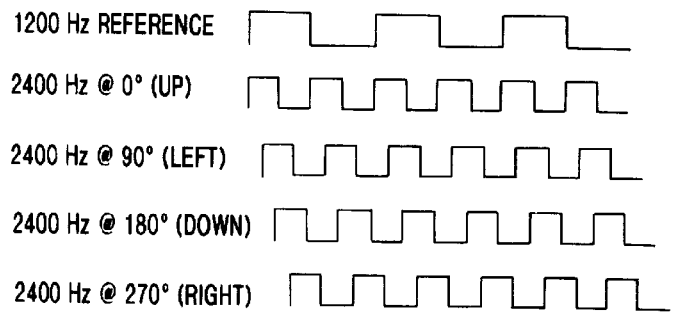
FIG. 6 illustrates a timing diagram of the signals which comprise the orientation determining signal emitted by the multiple LEDs of FIG. 3.

During operation, the CPU generates the orientation determining signal which is comprised of a phase unshifted 1200 Hz square wave (the position reference signal) which is added to each of four phase shifted 2400 Hz square waves (the phase components of the positioning signal). In other words, the signal on the LEDs is the sum of a 2400 Hz signal at 0, 90, 180 and 270 degrees and the 1200 Hz position reference signal. This addition is performed in the LED drivers 48, 50, 52, and 54 which function to amplify the sum of the signals and modulate the directional LEDs. (Reference may be had to FIG. 6 for an illustration of the timing of the signals which comprise the orientation determining signal). It will be understood by those skilled in the art that the reference signal may also be generated utilizing a separate LED.

Additionally, for use in transmitting function or command data, typically in response to the activation of a keypad button or switch, the CPU preferably generates a continuous 38.4 KHz signal and a base band button data signal. The button data signal is normally high but is adapted to go low when button data is being transmitted while in the pointing mode. Specifically, the button data is modulated with the 38.4 KHz sub-carrier signal by means of an AND gate which is, in turn, fed to the driver circuit 56 which modulates the command data LED 46. For the sake of brevity, the specific method by which function data is transmitted will not be discussed further herein. For a complete discussion pertaining to the transmission of function data, the reader is referred to U.S. Pat. No. 4,959,810 which is assigned to the assignee of the subject invention and which is incorporated herein by reference in its entirety.

Figure 7:
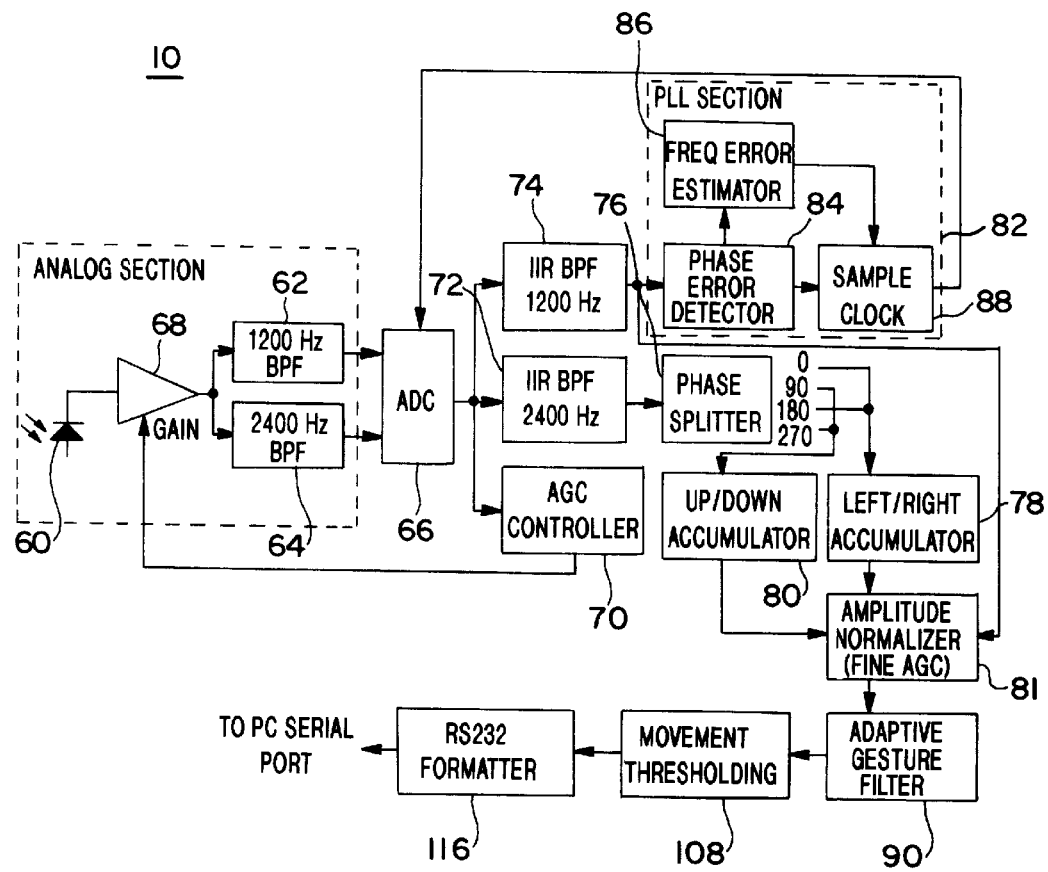
FIG. 7 illustrates a block diagram schematic of the receiver of FIG. 1.

Turning to FIG. 7, the electrical components which comprise the receiver 10 are illustrated. Specifically, the receiver 10 includes a photo diode 60 which is used to receive both the orientation determining signal and button data signal transmitted by the remote control 18. It will be understood that the button data signal may be sent directly to the electric appliance itself and, in such an arrangement, the photo diode 60 need only receive the orientation determining signal. The signal from the photo diode 60 is preferably amplified and band passed filtered for the purpose of separating the individual 38.4 KHz, 1200 Hz, and the 2400 Hz signals. More specifically, the 1200 Hz and 2400 Hz band pass filters 62,64 act as anti-aliasing filters and pre-filters before the 1200 Hz reference signal and 2400 Hz positioning signal are passed to an analog to digital converter (ADC) 66. Meanwhile, the amplifier 68 is linked to an automatic gain controller (AGC) 70 which monitors the output of the ADC 66, determines if the signal the ADC 66 sees needs to be amplified or attenuated as compared to a reference, and feeds back to the amplifier 68 a signal which sets the gain of the programmable gain amplifier 68 so that the ADC 66 receives a signal with an optimum amplitude. While the area enclosed in the "analog section" of FIG. 5 are seen to be physical analog circuitry and the functions outside the "analog section" are performed by DSP code residing in the CPU, it is to be understood that this configuration is not meant to be limiting and that those skilled in the art will understand that various other configurations are available to perform the functions described herein. For example, the DSP functions could also be performed by equivalent analog, digital, or switched capacitor circuitry without departing from the spirit of the subject invention.

The output of the ADC 66 is fed to a 2400 Hz infinite impulse response (IIR) band pass filter (BPF) 72 and a 1200 Hz IIR BPF 74. The 2400 Hz filter 72 is very narrow and only passes the positioning signal. As discussed, the 2400 Hz positioning signal is encoded in phase (up, left, down, right) and amplitude (how much up, left, down, right) and, therefore, the signal needs to be split into its four phase components. For this purpose, a phase splitter 76 is linked to the 2400 Hz filter 72 which is adapted to separate the 2400 Hz signal into its 0,90,180, and 270 degree phase components. The 0 and 180 degree phase components are fed to a left/right accumulator 78 while the 90 and 270 degree phase components are fed to a up/down accumulator 80 wherein the phase components are summed. The outputs of the accumulators 78,80, which are a function of the amplitude of the phase signals, are fed to an amplitude normalizer 81 which functions to normalize the outputs of the accumulators 78,80 according to the level of the 1200 Hz reference signal which is also fed the amplitude normalizer 81 from the 1200 Hz filter 74. This is done to ensure that the sensitivity of the receiver 10 to the angular motion of the remote control 18 will be the same as the remote control 18 moves closer or farther from the receiver 10.

The 1200 Hz filter 74 is similarly a narrow filter that only passes the reference signal. However, since the 2400 Hz positioning signal is sent as phase and amplitude relative to the 1200 Hz reference signal, the 1200 Hz signal is preferably phase locked to ensure that the 1200 Hz can be properly used as a reference. Accordingly, the clean, filtered 1200 Hz signal is fed to a 2nd order PLL 82 that is used to accurately track the phase and frequency of 1200 Hz signal transmitted from the remote control 18. Due to the filter 74 positioned in front of the PLL 82, the PLL has a 4th order stability function. The PLL 82 is linked to the ADC 60 and is used to regulate the sample timing of the ADC 60. This regulated timing allows the position processing componentry to extract meaningful phase information.

More specifically, the PLL 82 is comprised of a phase error detector 84, frequency error estimator 86 and a sample clock 88. The phase error detector 84 determines if there is a phase difference between the internal clock and the reference signal. The phase error detector 84 outputs the direction of this error to the frequency error detector 86 which uses the phase tracking information received from the phase error detector 84 to determine if a frequency correction is necessary. In particular, if the phase error detector 84 outputs a net phase lag error, the frequency error detector 86 will function to increase the tracking frequency. If the phase error detector 84 outputs a net phase lead error, the frequency error detector 86 will function to decrease the tracking frequency. Linked to both the phase error detector 84 and the frequency error detector 86 is the sample clock 88 which takes the outputs from the phase error detector 84 and the frequency error detector 86 to determine the correct tracking frequency and phase of a 9600 Hz sampling clock. As discussed, the output of the sample clock 88 is fed back to the ADC 60 for use in timing the sampling of the positioning and reference signals.

The output of the amplitude normalizer 81 comprises an X component (indicative of right left orientation) and a Y component (indicative of up-down orientation). This orientation information is fed to an adaptive gesture filter 90 for further processing. In particular, the adaptive gesture filter 90 is adapted to provide maximal low pass filtering when the user is making relatively small and slow orientation changing movements of the remote control 18 and minimal low pass filtering when the user is making relatively large and fast orientation changing movements of the remote control 18. This adaptive filtering allows the X and Y orientation components to approximately linearly track the orientation of the remote control when such small and slow movements are being made and allows the X and Y orientation components to non-linearly track the orientation of the remote control when such large and fast movements are being made. In other words, this adaptive filtering allows a cursor shown on the display 14 to linearly track small movements of the remote control 18 thereby providing the user with the ability to precisely position a cursor shown on the display 14. Meanwhile, fast sweeping movements of the remote control 18 will cause the cursor shown on the display 14 to move over a somewhat larger line than that actually experienced by the remote control 18 thereby providing the user with the ability to imprecisely but quickly move the cursor over large distances about the display 14.

Figure 8:
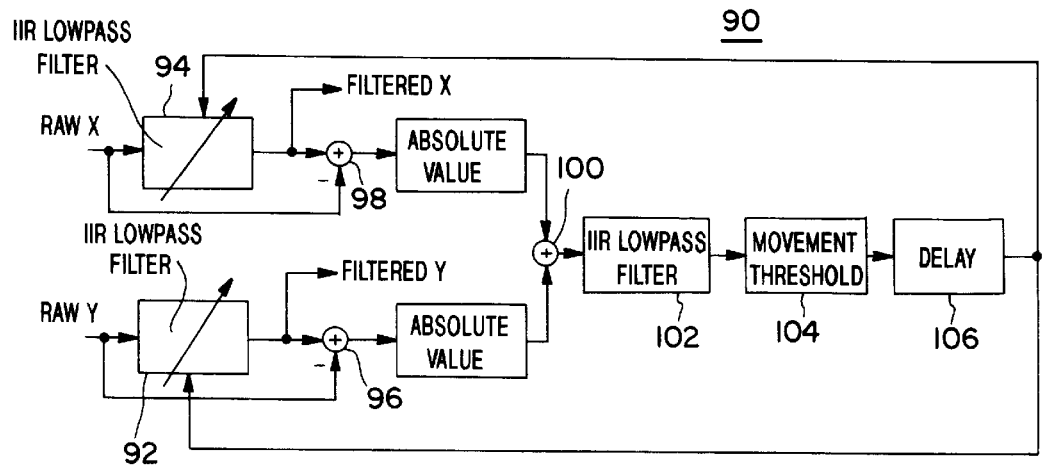
FIG. 8 illustrates a block diagram schematic of the adaptive gesture filter of FIG. 7.

Turning to FIG. 8, the adaptive gesture filter 90 is shown in greater detail. As discussed, the input of the adaptive gesture filter 90 is the raw X and Y orientation data received from the amplitude normalizer 81. This raw X and Y orientation data is further filtered utilizing a pair of self adaptive, variable IIR low pass filters 92,94 which are utilized to provide the aforementioned user comfort. Specifically, when relatively fast/large movements of the remote control 18 are detected the filters are set to have a wide bandwidth and when relatively slow/small movements of the remote control 18 are detected the filters are set to have a narrow bandwidth. It is preferred that the switching between large and narrow bandwidths be done with a delay to avoid cursor skipping which tends to result if immediate switching between narrow and wide bandwidth low pass filtering is done.

To control the delay in switching between the narrow and wide bandwidths, the output of the filters 92,94 are passed to summers 96,98 which determine the difference between the filtered X or Y orientation data and the raw X or Y orientation data. The absolute value of the differences between the filtered X and Y orientation data and the corresponding raw X and Y orientation data are further passed to a summer 100 and fed to a IIR low pass filter 102 which filters and removes any noise or spike differences. The output of the low pass filter 102 is a true delay value which is comprised of the combined, filtered differences between the filtered X and Y orientation data and the corresponding raw X and Y orientation data. This true delay value is fed into a movement threshold comparator 104 where the true value delay is compared against at least one predetermined threshold delay. A relatively small difference in the true value delay as compared to a predetermined threshold delay is indicative that the filtered X or Y orientation data is tracking the remote control 18 correctly while a relatively large difference in the true value delay as compared to a predetermined threshold delay is indicative that the filters 92,94 are delaying the output by an unacceptable amount. If the delay is determined to be to relatively large, the movement threshold comparator 104 causes the X and Y IIR lowpass filters 92,94 to switch to a wide bandwidth. If the delay is determined to be relatively small, a span of time will pass in the delay function 106 before the X and Y IIR lowpass filters 92,94 are set to a narrow bandwidth.

Figure 9:
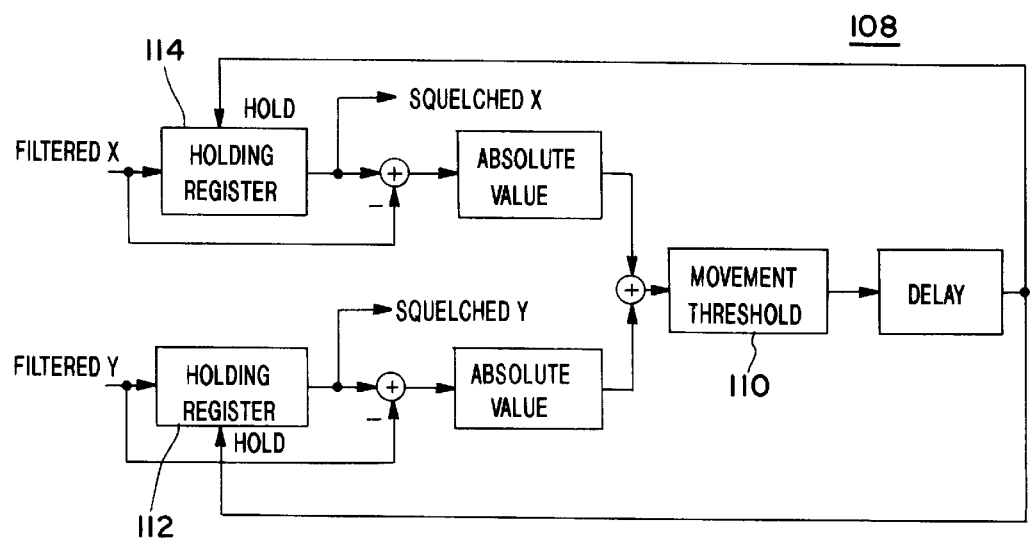
FIG. 9 illustrates a block diagram schematic of the movement thresholding comparator circuit of FIG. 7.

The filtered X and Y orientation data are next processed by a movement thresholding circuit 108. The movement thresholding circuit 108, seen in FIG. 9, functions to keep minor movements due to noise or shaky hands to be ignored. Specifically, the newly filtered X and Y orientation data are each compared against their respective currently held X and Y orientation data the absolute value differences of which are each summed and compared in a second movement threshold comparator 110 against at least one second predetermined movement threshold value. If the comparison indicates that the position difference is greater than the second predetermined movement threshold value the currently held X and Y orientation data in the holding registers 112,114 is changed to the newly filtered X and Y orientation data. However, if the comparison indicates that the position difference is less than the second predetermined movement threshold value the currently held X and Y orientation data will remain unchanged in the holding registers 112,114. The values thus stored in the holding registers 112,114, along with the button press/function data, is thereafter formatted and sent to the electronic device 12 via a RS232 formatter 116 which functions to break the final X orientation, Y orientation, and function data into blocks of bytes which are transmitted by toggling an I/O pin on the CPU 42.

In an alternative embodiment of the subject invention, a sub-carrier may be used on either or both of the 1200 Hz and 2400 Hz signals. In this embodiment, the remote control is modified so that the 1200 Hz and 2400 Hz signals are and-gated with a higher frequency signal such as a 38 KHz or 455 KHz signal while the base is modified to have an appropriately tuned front end, high frequency receiver and a demodulator for use in recovering the 1200 Hz and 2400 Hz baseband signals. This approach allows the signaling to occur in a frequency spectrum that has far less florescent light interference.

In a further embodiment of the signaling method undersampling may be utilized. In this embodiment, the remote control is modified to allow for the transmission of a reference and/or positioning signal which has been sub-carrier modulated to a higher frequency. Meanwhile the front end of the receiver is adapted to receive the higher frequency transmission. The received signal is then fed directly to the ADC without demodulation. Since the ADC samples the signal at a rate below the sub-carrier, the sub-carrier and reference and/or positioning signals are aliased back in band. Again, such an approach allows the signaling to occur in a frequency spectrum that has far less florescent light interference while eliminating the costs associated with the use of a demodulator circuit.

In another embodiment of the subject invention, the lens 30 is replaced with a ground glass and smoked glass arrangement which is adapted to generate the radiation pattern described previously. Since LEDs have some undesirable radiation pattern attributes which include unit to unit variations in radiation pattern and intensity, a sheet of ground glass and smoked glass, having a varying amounts of absorption in one direction and a constant amount of absorption in the orthogonal direction, are placed in front of the LED to fix the patterns. Specifically, the ground glass is used to scatter the light emitted by the LED evenly in all directions whereafter the smoked glass sheet functions to generate the desired radiation intensity pattern.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A wireless control and pointer system for controlling electronic equipment, comprising:
    a hand held remote control comprising a first infrared signal emitter for use in transmitting a first infrared signal comprising a plurality of signal components each of which is transmitted at a first frequency but out of phase with respect to the other of said plurality of signal components; and
    a receiver comprising an infrared signal sensor adapted to receive infrared signals, a circuit connected to said infrared signal sensor for generating an orientation signal indicative of the orientation of said remote control as a function of the amplitude of each of said plurality of signal components of said infrared signal, and an interface circuit for transmitting a command signal indicative of said orientation signal to said electronic equipment for use in the control thereof.

2. A wireless control and pointer system for controlling electronic equipment, comprising:
    a hand held remote control comprising a infrared signal emitter for use in transmitting an infrared signal comprising a plurality of separately identifiable signal components and a means for synchronizing the transmission of said plurality of separately identifiable signal components to an external interference signal; and
    a receiver comprising an infrared signal sensor adapted to receive infrared signals, a circuit connected to said infrared signal sensor for generating an orientation signal indicative of the orientation of said remote control as a function of a characteristic of said plurality of separately identifiable signal components, and an interface circuit for transmitting a command signal indicative of said orientation signal to said electronic equipment for use in the control thereof.

3. A remote control for use in controlling the positioning of a cursor displayed on an electronic device in a wireless control and pointer system, comprising:
    a first infrared signal emitter for use in transmitting a first infrared signal comprising a plurality of signal components each of which is transmitted at a first frequency but out of phase with respect to the other of said plurality of signal components, and wherein said first infrared signal further comprises a reference signal at a second frequency, said first infrared signal being utilized by said electronic device to control the positioning of said cursor.

4. A hand-held remote control for use in controlling the positioning of a cursor displayed on an electronic device in a wireless control and pointer system, comprising:
    an infrared signal emitter for use in transmitting an infrared signal comprising a plurality of separately identifiable signal components;
    a sensor for detecting a frequency of a power source supplied to an external light source; and
    a means for variably synchronizing the transmission of the infrared signal to the detected frequency;
    wherein the infrared signal is utilized by the electronic device to control the positioning of said cursor.

5. A wireless control and pointer system for controlling electronic equipment, the system comprising:
    a hand held remote control comprising an emitter adapted to transmit a signal having at least two signal components phase shifted relative to each other and a radiation-patten-modification lens positioned relative to the emitter to vary amplitude of each of the at least two signal components as a function of respective angles measured relative to an axis; and
    a receiver comprising
        a signal sensor adapted to receive signals,
        a circuit connected to the signal sensor for generating an orientation signal indicative of the orientation of the remote control as a function of the amplitude of each of the at least two signal components of the signal, and
        an interface circuit for transmitting a command signal indicative of the orientation signal to the electronic equipment for use in the control thereof.

6. The system of claim 5,
    wherein the signal has four signal components, including the at least two signal components, wherein each of the four signal components is phase shifted relative to the other of the four signal components, and
    wherein the axis to which each of the respective angles of the signal components is measured is a central axis.

7. A hand held wireless control system comprising:
    an emitter adapted to transmit a signal at a frequency; and
    a synchronizer coupled to the emitter including:
        an optical sensor for determining a first interference signal frequency; and
        means coupled to the optical sensor and adapted to tune the frequency of the signal to a multiple of the first interference signal frequency.

8. The system of claim 7, wherein the multiple of the first interference signal frequency is also a multiple of a second interference signal frequency.

9. The system of claim 8, wherein the first interference signal frequency is 100 Hz and the second interference signal frequency is 120 Hz.

10. The system of claim 7, wherein the means coupled to the optical sensor comprises phase locked loop means coupled to the emitter.

11. A hand held wireless control system comprising:
    an emitter adapted to transmit a signal at a frequency;
    a sensor for detecting a frequency of a power source supplied to an external light source; and synchronization means couple to the emitter for variably tuning the transmission of the signal to the detected frequency.

12. The system of claim 11, wherein the synchronization means tunes the signal to a multiple of the first interference signal frequency and a second interference signal frequency.

13. The system of claim 11, wherein the synchronization means comprises means for updating position data as a function of the first interference signal frequency.

14. The system of claim 13, wherein the means for updating position data updates the position data at multiples of 50 Hz.

15. The system of claim 13, wherein the means for updating position data updates the position data at multiples of 60 Hz.

16. The system of claim 11, wherein the synchronization means includes a phase locked loop circuit.

\* \* \* \* \*